United States Patent
Mizutani et al.

(10) Patent No.: US 10,818,973 B2
(45) Date of Patent: Oct. 27, 2020

(54) ELECTROLYTE COMPOSITION AND LITHIUM ION SECONDARY BATTERY

(71) Applicant: TOYOTA JIDOSHA KABUSHIKI KAISHA, Toyota-shi, Aichi-ken (JP)

(72) Inventors: Mamoru Mizutani, Nagakute (JP); Shin-ichi Ogata, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 120 days.

(21) Appl. No.: 16/135,105

(22) Filed: Sep. 19, 2018

(65) Prior Publication Data

US 2019/0123391 A1    Apr. 25, 2019

(30) Foreign Application Priority Data

Oct. 25, 2017 (JP) .................................. 2017-206512
Mar. 15, 2018 (JP) .................................. 2018-047790

(51) Int. Cl.
| | |
|---|---|
| *H01M 10/0525* | (2010.01) |
| *H01M 10/056* | (2010.01) |
| *H01M 10/0562* | (2010.01) |
| *H01M 10/0567* | (2010.01) |
| *H01M 10/0569* | (2010.01) |
| *H01M 10/052* | (2010.01) |
| *H01M 10/42* | (2006.01) |
| *H01M 10/0568* | (2010.01) |
| *H01M 2/02* | (2006.01) |

(52) U.S. Cl.
CPC ..... *H01M 10/0569* (2013.01); *H01M 10/052* (2013.01); *H01M 10/0525* (2013.01); *H01M 10/0567* (2013.01); *H01M 10/0568* (2013.01); *H01M 10/4235* (2013.01); *H01M 2/0217* (2013.01); *H01M 2300/0025* (2013.01); *H01M 2300/0028* (2013.01); *H01M 2300/0091* (2013.01)

(58) Field of Classification Search
CPC .......... H01M 10/0525; H01M 10/056; H01M 10/0562; H01M 10/0569; H01M 2300/0028
See application file for complete search history.

(56) References Cited

U.S. PATENT DOCUMENTS

| | | | |
|---|---|---|---|
| 2010/0248025 A1* | 9/2010 | Kimura | H01M 10/052 429/207 |
| 2014/0322615 A1* | 10/2014 | Uehara | H01M 10/0525 429/327 |
| 2016/0126542 A1* | 5/2016 | Han | H01M 4/366 429/223 |

FOREIGN PATENT DOCUMENTS

| | | |
|---|---|---|
| JP | 2001-229966 A | 8/2001 |
| JP | 2013-218843 A | 10/2013 |

* cited by examiner

*Primary Examiner* — Brittany L Raymond
(74) *Attorney, Agent, or Firm* — Sughrue Mion, PLLC (57) ABSTRACT

The electrolyte composition at least includes an aprotic organic solvent, a lithium salt, a flame retardant, and inorganic oxide particles. The flame retardant is at least one selected from a group consisting of a phosphorus-based acid ester having a fluorinated alkyl group and a phosphate amide having a fluorinated alkyl group.

13 Claims, 4 Drawing Sheets

ELECTROLYTE COMPOSITION AND LITHIUM ION SECONDARY BATTERY

This non-provisional application is based on Japanese Patent Applications No. 2017-206512 filed on Oct. 25, 2017 and No. 2018-047790 filed on Mar. 15, 2018 with the Japan Patent Office, the entire contents of which are hereby incorporated by reference.

BACKGROUND

Field

The present disclosure relates to an electrolyte composition and a lithium ion secondary battery.

Description of the Background Art

Japanese Patent Laying-Open No. 2013-218843 discloses an electrolyte solution containing tris(2, 2, 2-trifluoroethyl) phosphate.

SUMMARY

In general, the electrolyte solution for a lithium ion secondary battery is flammable, since the solvent in the electrolyte solution is organic and has a low boiling point and a low flash point. Conventionally, as disclosed in, for example, Japanese Patent Laying-Open No. 2013-218843, investigations have been carried out to impart flame retardancy to an electrolyte solution by adding a phosphate-based flame retardant or the like to an electrolyte solution.

The electrolyte solution added with a phosphate-based flame retardant may have such a property that combustion is difficult to continue after ignition (flame retardancy). However, the electrolyte solution does not have the property of being difficult to be ignited (ignition retardancy).

An object of the present disclosure is to provide an electrolyte composition having ignition retardancy.

Hereinafter, the technical configuration and effects of the present disclosure will be described. However, the mechanism of action described in the present disclosure includes a presumption. Whether the mechanism of action is correct or not should not limit the scope of the claims.

[1] The electrolyte composition of the present disclosure is used in a lithium ion secondary battery.

The electrolyte composition of the present disclosure at least includes an aprotic organic solvent, a lithium salt, a flame retardant, and inorganic oxide particles. The flame retardant is at least one selected from a group consisting of a phosphorus-based acid ester having a fluorinated alkyl group and a phosphate amide having a fluorinated alkyl group.

In the present disclosure, the term of "phosphorus-based acid ester" refers to an ester of an acid containing a phosphorus atom (+V) or a phosphorus atom (+III).

The phosphorus-based acid ester includes a phosphate represented by the following formula (1), a phosphonate represented by the following formula (2), a phosphinate represented by the following formula (3), and a phosphite represented by the following formula (4). The following formula (5) represents a phosphate amide.

In the following formulas (1) to (5), the alkyl group ($R^1$, $R^2$ and $R^3$) forming the ester contains a fluorine atom (F). In other words, $R^1$, $R^2$ and $R^3$ each is a fluorinated alkyl group. The number of carbon atoms in each fluorinated alkyl group may be, for example, 1 or more and 6 or less. Each fluorinated alkyl group may be linear or may be branched. All of hydrogen atoms (H) or a part of hydrogen atoms in each fluorinated alkyl group may be substituted with fluorine atoms.

In the following formulas (1), (2) and (5), $R^1$ and $R^2$ (or $R^3$) may be substituted with an alkylene group (—$R^4$—) so as to form a cyclic structure.

R', R" and R* each is directly bonded to a phosphorus atom (P) or a nitrogen atom (N). R', R" and R* each may be a hydrogen atom, an alkyl group or an aromatic group. R', R" and R* each may not contain a fluorine atom. However, when R', R" and R* each is an alkyl group or an aromatic group, each of R', R" and R* may contain fluorine atoms.

(1)

(2)

(3)

(4)

(5)

Hereinafter, the phosphorus-based acid ester having a fluorinated alkyl group may be abbreviated as "fluorinated phosphorus-based acid ester", and the phosphate amide having a fluorinated alkyl group may be abbreviated as "fluorinated phosphate amide". Furthermore, at least one selected from a group consisting of the fluorinated phosphorus-based acid ester and the fluorinated phosphate amide may be collectively referred to as "fluorinated phosphorus-based acid ester or the like".

It is considered that the electrolyte composition of the present disclosure develops its ignition retardancy due to the synergistic action between the fluorinated phosphorus-based acid ester or the like and the inorganic oxide particles.

Figure 1:
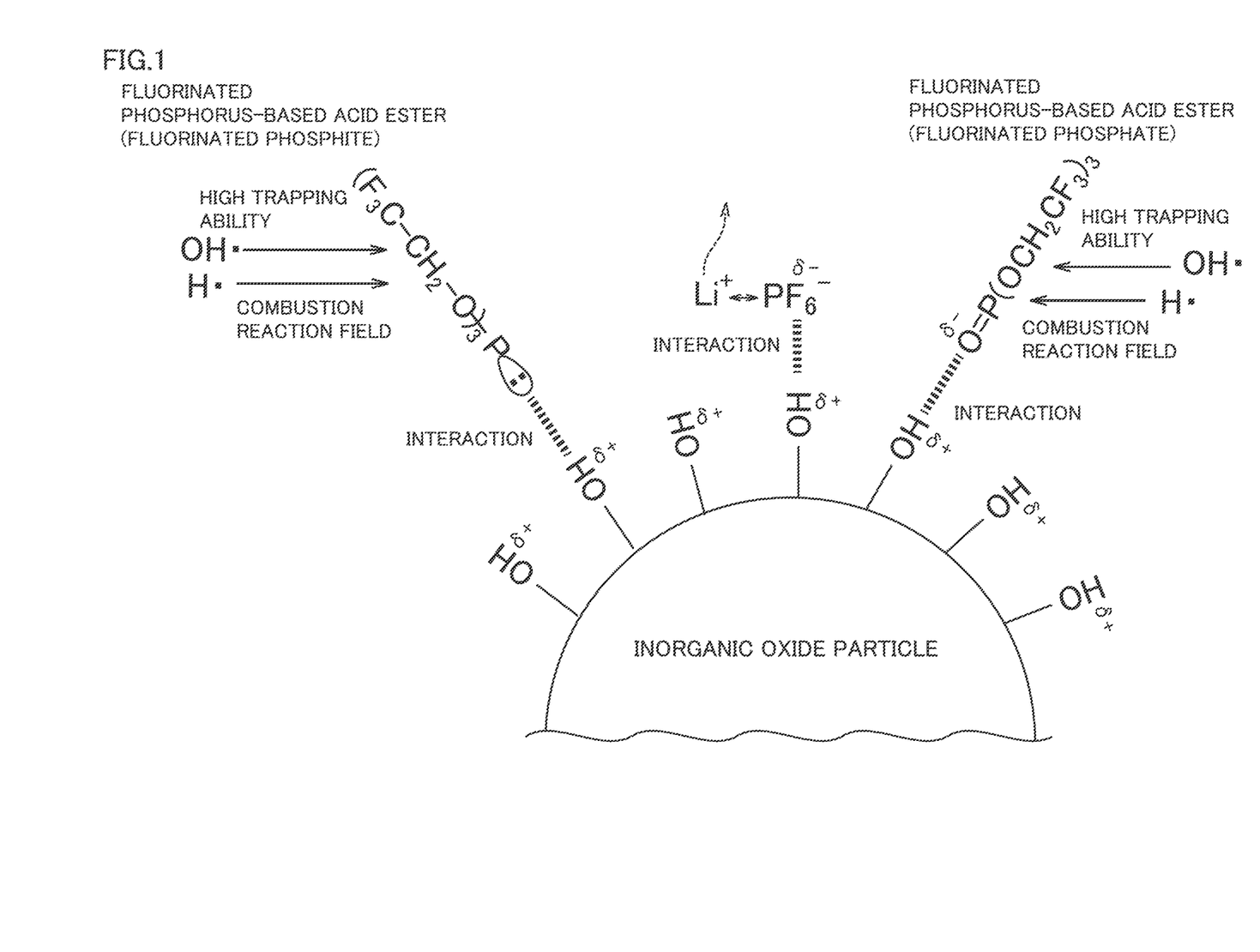
FIG. 1 is a conceptual diagram for explaining an action mechanism of the present disclosure.

FIG. 1 is a conceptual diagram for explaining an action mechanism of the present disclosure.

In the co-presence of an aprotic organic solvent (hereinafter abbreviated as "solvent" where necessary) and oxygen, if an ignition source is further present, hydrogen radicals (H•) and hydroxyl radicals (OH•) or the like may be generated. Due to the chain reaction of these radicals, a rapid oxidation reaction, in other words, a combustion reaction may occur.

A large number of hydroxyl groups (—OH) may be present on the surface of the inorganic oxide particles. The hydrogen atom (H) at the end of each hydroxyl group may be positively charged ($\delta^+$) due to polarization. In FIG. 1, as an example of the fluorinated phosphorus-based acid ester or the like, tris(2, 2, 2-trifluoroethyl) phosphate (O=P(OCH$_2$CF$_3$)$_3$) is illustrated. The oxygen atom (O) of O=P group in the fluorinated phosphorus-based acid ester or the like may be negatively ($\delta^-$) charged due to polarization. It is likely that a hydrogen bond is formed between a positively charged hydrogen atom and a negatively charged oxygen atom. Therefore, the fluorinated phosphorus-based acid ester or the like is likely to be attracted to the surface of the inorganic oxide particles, and thereby selectively adsorbed on the surface of the inorganic oxide particles. As a result, the fluorinated phosphorus-based acid ester or the like is present on the surface of the inorganic oxide particles at a high concentration. In FIG. 1, as an example of phosphite, tris(2, 2, 2-trifluoroethyl) phosphite (P(OCH$_2$CF$_3$)$_3$) is illustrated. The phosphite is also likely to be selectively adsorbed on the surface of the inorganic oxide particles due to the participation of the lone-pair electrons (••) on the phosphorus atom (+III) in hydrogen bonding.

The surface of the inorganic oxide particles dispersed in the solvent may serve as a reaction field for combustion reaction. The fluorinated phosphorus-based acid ester or the like may function to trap hydrogen radicals and hydroxyl radicals. Since the fluorinated phosphorus-based acid ester or the like may be present on the surface of the inorganic oxide particles at a high concentration, even if hydrogen radicals and hydroxyl radicals are generated, they would be efficiently trapped by the fluorinated phosphorus-based acid ester or the like before ignition. Accordingly, the electrolyte composition of the present disclosure is ignition-retardant.

[2] The flame retardant may be at least one selected from a group consisting of tris(2, 2, 2-trifluoroethyl) phosphate, tris(2, 2, 2-trifluoroethyl) phosphite and bis(2, 2, 2-trifluoroethyl) methylphosphonate, for example.

[3] The aprotic organic solvent and the flame retardant may satisfy a relationship of aprotic organic solvent/flame retardant=70/30 to 80/20 in volume ratio. It is also expected to achieve excellent charging/discharging efficiency and electrical conductivity within such range.

[4] The inorganic oxide particles may be at least one selected from a group consisting of silica particles and zirconia particles, for example.

[5] The ratio of the inorganic oxide particles to the electrolyte composition may be, for example, 5 mass % or more to 10 mass % or less. It is also expected to achieve excellent charging/discharging efficiency and electrical conductivity within such range.

[6] The inorganic oxide particles may be mesoporous. Due to the fact that the inorganic oxide particles contain a plurality of mesopores, the inorganic oxide particles have a larger specific surface area. In the mesoporous inorganic oxide particles, a large number of hydroxyl groups may exist not only on the outer surface of the particles but also on the inner wall of mesopores. As described above, the surface of the inorganic oxide particles may serve as an adsorption field for the fluorinated phosphorus-based acid ester or the like. By increasing the specific surface area of the inorganic oxide particles, it is expected that more fluorinated phosphorus-based acid ester or the like will be adsorbed on the surface of the inorganic oxide particles. Meanwhile, the surface of the inorganic oxide particles may also serve as the reaction field for the combustion reaction. Therefore, by increasing the specific surface area of the inorganic oxide particles, it is expected that the fluorinated phosphorus-based acid ester or the like will trap hydrogen radicals and hydroxyl radicals more efficiently. As a result, it is expected to improve the ignition retardancy of the electrolyte composition.

[7] The inorganic oxide particles described in the above [6] may be spherical, and the mesopores contained in each inorganic oxide particle may extend radially from the center of each inorganic oxide particle toward the outer surface thereof. Since the inorganic oxide particles are spherical and the mesopores extend radially from the center of each particle toward the outer surface thereof, it is expected that excellent access is available from the outer surface of each particle to the inside thereof, which thereby further increase the effective area of the reaction field for the combustion reaction and the effective area of the adsorption field for the fluorinated phosphorus-based acid ester or the like. As a result, it is expected to improve the ignition retardancy of the electrolyte composition.

[8] A lithium ion secondary battery of the present disclosure includes at least the electrolyte composition according to any one of the above [1] to [7]. Since the electrolyte composition is ignition retardant, the lithium ion secondary battery of the present disclosure is expected to be resistant to abnormal usage involving heating, short circuit, overcharge and the like.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (also referred to as "the present embodiment" in the present specification) will be described. It should be noted that the following description is not intended to limit the scope of claims.

Electrolyte Composition

The electrolyte composition of the present embodiment contains at least an aprotic organic solvent, a lithium salt, a flame retardant, and inorganic oxide particles. The electrolyte composition may further contain the other ingredients (to be described later).

The electrolyte composition of the present embodiment may have ignition retardancy. In addition, the electrolyte composition may have sufficient electrical conductivity. The electrolyte composition may have an electrical conductivity of, for example, 4.0 mS/cm or more and 7.4 mS/cm or less. The electrolyte composition may have an electrical conductivity of, for example, 4.2 mS/cm or more and 7.4 mS/cm or less. The electrolyte composition may have an electrical conductivity of, for example, 5.2 mS/cm or more and 7.4 mS/cm or less. The electrical conductivity of the electrolyte composition may be measured by using a common conductivity meter. The electrical conductivity may be measured at least three times, and the arithmetic average of the at least three measurements may be adopted as the measurement result.

"Aprotic Organic Solvent"

The aprotic organic solvent ("the solvent") is not particularly limited. For example, the solvent may be a mixture of a cyclic carbonate and a chain carbonate. The mixing ratio may be, for example, cyclic carbonate/chain carbonate=10/90 to 50/50 in volume ratio.

The cyclic carbonate may be, for example, ethylene carbonate (EC), propylene carbonate (PC), butylene carbonate (BC), fluoroethylene carbonate (FEC) or the like. The cyclic carbonate may be used alone in one kind or in combination of two or more kinds.

The chain carbonate may be, for example, dimethyl carbonate (DMC), ethyl methyl carbonate (EMC), diethyl carbonate (DEC) or the like. The chain carbonate may be used alone in one kind or in combination of two or more kinds.

The solvent may include, for example, lactone, cyclic ether, chain ether, and carboxylic ester or the like. The lactone may be, for example, γ-butyrolactone (GBL), δ-valerolactone or the like. The cyclic ether may be, for example, tetrahydrofuran (THF), 1, 3-dioxolane, 1, 4-dioxane or the like. The chain ether may be, for example, 1, 2-dimethoxyethane (DME) or the like. The carboxylic ester may be, for example, methyl formate (MF), methyl acetate (MA), methyl propionate (MP) or the like.

"Lithium Salt"

The lithium salt is a supporting electrolyte. The lithium salt is dissolved in the solvent. The electrolyte composition may contain, for example, 0.5 mol/l or more and 2 mol/l or less of a lithium salt. The lithium salt may be, for example, $LiPF_6$, $LiBF_4$, $Li[N(FSO_2)_2]$, $Li[N(CF_3SO_2)_2]$ or the like. The lithium salt may be used alone in one kind or in combination of two or more kinds.

The lithium salt dissociates into a lithium ion and a counter anion in solvent. It is considered that the greater the amount of lithium ions is generated by the dissociation of the lithium salt, the higher the electrical conductivity of the electrolyte composition will be improved. In the electrolyte composition of the present embodiment, if the counter anion of a lithium salt such as $LiPF_6$ is a molecular ion and the terminal of the molecular ion is fluorine atom, the dissociation of such lithium salt will be promoted. As illustrated in FIG. 1, the fluorine atom (F) of the counter anion ($PF_6^-$) and the hydroxyl group (OH) of the inorganic oxide particle are likely to form a hydrogen bond therebetween, which the detachment of lithium ion ($Li^+$) to occur.

"Flame Retardant"

The flame retardant is mixed in the solvent. The flame retardant imparts ignition retardancy to the electrolyte composition together with the inorganic oxide particles. In the electrolyte composition, the solvent and the flame retardant may satisfy the relationship of, for example, the solvent/the flame retardant=70/30 to 80/20 in volume ratio. It is also expected to achieve excellent charging/discharging efficiency and electrical conductivity within such range. If the volume ratio of the flame retardant is excessively great, the electrical conductivity or the like may be deteriorated. When the flame retardant contains two or more ingredients, it is acceptable that the solvent and the flame retardant satisfy the relationship of the solvent/the sum of ingredients=70/30 to 80/20 in volume ratio.

The flame retardant is at least one selected from a group consisting of a phosphorus-based acid ester having a fluorinated alkyl group (fluorinated phosphorus-based acid ester) and a phosphate amide having a fluorinated alkyl group (fluorinated phosphate amide). The fluorinated phosphorus-based acid ester is represented by the above formulas (1) to (4), and the fluorinated phosphate amide is represented by the above formula (5).

As examples of the fluorinated phosphorus-based acid ester (fluorinated phosphate) represented by the above formula (1), tris(2, 2, 2-trifluoroethyl) phosphate (TFEPa) represented by the following formula (6), tris(2, 2, 3, 3-tetrafluoropropyl) phosphate, tris(2, 2, 3, 3, 3-pentafluoropropyl) phosphate, tris(1H, 1H-heptafluorobutyl) phosphate, tris(1H, 1H, 5H-octafluoropentyl) phosphate and the like may be given. As examples of the phosphate having a cyclic structure, ethylene trifluoroethyl phosphate represented by the following formula (7) may be given.

(6)

(7)

As examples of the fluorinated phosphorus-based acid ester (fluorinated phosphonate) represented by the above formula (2), bis(2, 2, 2-trifluoroethyl) methylphosphonate (BFEMPo) represented by the following formula (8), bis(2, 2, 2-trifluoroethyl) ethylphosphonate represented by the following formula (9), bis(2, 2, 2-trifluoroethyl) phosphonate represented by the following formula (10) and the like may be given.

(8)

(9)

(13)

(10)

As examples of the fluorinated phosphous-based acid ester (fluorinated phosphinate) represented by the above formula (3), (2, 2, 2-trifluoroethyl) diethylphosphinate represented by the following formula (11) and the like may be given.

(11)

As examples of the fluorinated phosphorus-based acid ester(fluorinated phosphite) represented by the above formula (4), tris(2, 2, 2-trifluoroethyl) phosphite (TFEPi) represented by the following formula (12), tris(2, 2, 3, 3-tetrafluoropropyl) phosphite, tris(2, 2, 3, 3, 3-pentafluorobutyl) phosphite, tris(1H, 1H-heptafluorobutyl) phosphite, tris(1H, 1H, 5H-octafluoropentyl) phosphite and the like may be given.

(12)

As examples of the fluorinated phosphate amide represented by the above formula (5), O,O-bis(2, 2, 2-trifluoroethyl) N,N-dimethyl phosphoramidate represented by the following formula (13) and the like may be given.

The fluorinated phosphate, the fluorinated phosphonate, the fluorinated phosphinate, the fluorinated phosphite and the fluorinated phosphate amide mentioned above may be used alone in one kind or in combination of two or more kinds.

The flame retardant may be, for example, at least one selected from a group consisting of the fluorinated phosphate, the fluorinated phosphite and the fluorinated phosphonate. The flame retardant may be, for example, at least one selected from a group consisting of TFEPa, TFEPi and BFEMPo.

"Inorganic Oxide Particles"

The inorganic oxide particles impart ignition retardancy to the electrolyte composition together with the flame retardant. The inorganic oxide particles are dispersed in solvent. The ratio of the inorganic oxide particles to the electrolyte composition may be, for example, 3 mass % or more to 10 mass % or less. The ratio of the inorganic oxide particles to the electrolyte composition may be, for example, 5 mass % or more to 10 mass % or less. It is also expected to achieve excellent charging/discharging efficiency and electrical conductivity within such range. If the mass ratio of the inorganic oxide particles is excessively high, the viscosity of the electrolyte composition may increase, which may deteriorate the electrical conductivity thereof. When the electrolyte composition contains two or more kinds of inorganic oxide particles, it is acceptable that the ratio of the total of the inorganic oxide particles to the electrolyte composition is, for example, 5 mass % or more to 10 mass % or less.

The inorganic oxide particles may have an average particle size of, for example, 0.5 nm or more and 5 μm or less. The average particle size of the inorganic oxide particles is measured by, for example, the dynamic light scattering method or the electron microscopy method. The electron microscope may be a transmission electron microscope (TEM) or a scanning electron microscope (SEM). Measurement may be carried out in accordance with "JIS Z8826", for example. The average particle size may be measured at least three times, and the arithmetic average of the at least three measurements may be adopted as the measurement result.

The inorganic oxide particles may be nanoparticles, which may improve the ignition retardancy of the electrolyte composition. The inorganic oxide particles may have an average particle size of, for example, 1 nm or more and 100 nm or less. The inorganic oxide particles may have an average particle size of, for example, 7 nm or more and 20 nm or less.

The inorganic oxide particles may have a BET specific surface area of, for example, 50 m$^2$/g or more and 2000 m$^2$/g or less. It is expected that the trapping of hydrogen radicals and hydroxyl radicals will be promoted within such range. The inorganic oxide particles may have a BET specific surface area of, for example, 50 m$^2$/g or more and 380 m$^2$/g or less. The BET specific surface area of the inorganic oxide particles may be calculated by performing the adsorption/desorption measurement on nitrogen gas so as to obtain an adsorption and desorption isothermal curve and thereafter analyzing the adsorption and desorption isothermal curve according to the BET (Brenauer-Emmet-Telle) multipoint method. The adsorption/desorption measurement may be carried out by using a common specific surface area measuring apparatus. The BET specific surface area may be measured at least three times, and the arithmetic average of the at least three measurements may be adopted as the measurement result.

The inorganic oxide particle may have a large number of hydroxyl groups on its surface. As examples of the inorganic oxide particles which may have a suitable amount of hydroxyl group, silica particles ($SiO_2$), zirconia particles ($ZrO_2$), alumina particles ($Al_2O_3$), boehmite particles (AlO(OH)), titania particles ($TiO_2$) and the like may be given. The inorganic oxide particle may be used alone in one kind or in combination of two or more kinds. In other words, the inorganic oxide particles may be at least one selected from a group consisting of, for example, silica particles, zirconia particles, alumina particles, boehmite particles and titania particles. The inorganic oxide particles may be at least one selected from a group consisting of, for example, silica particles and zirconia particles.

In the inorganic oxide particles, the number density of the hydroxyl groups may be 3 per $nm^2$ or more and 5 per $nm^2$ or less, for example. The trapping of hydrogen radicals and hydroxyl radicals is expected to be improved within such range. The concentration of hydroxyl group may be measured by using, for example, the potentiometric titration method, the infrared spectroscopy method or the solid nuclear magnetic resonance method. The concentration of hydroxyl group may be measured at least three times, and the arithmetic average of the at least three measurements may be adopted as the measurement result.

The inorganic oxide particles may be mesoporous, which may improve the ignition retardancy of the electrolyte composition. When saying that "the inorganic oxide particles are mesoporous", it means that the inorganic oxide particles are porous and the pores inside the inorganic oxide particles are mesopores. In the present specification, if the average pore size of the pores inside the inorganic oxide particles is 2 nm or more and 50 nm or less, these pores are regarded as mesopores. The average pore size is calculated by performing the adsorption/desorption measurement on nitrogen gas so as to obtain an adsorption and desorption isothermal curve and thereafter analyzing the adsorption and desorption isothermal curve according to the BJH (Barrett-Joyner-Hallender) method. The average pore size may be, for example, 1 nm or more and 10 nm or less.

Figure 3:
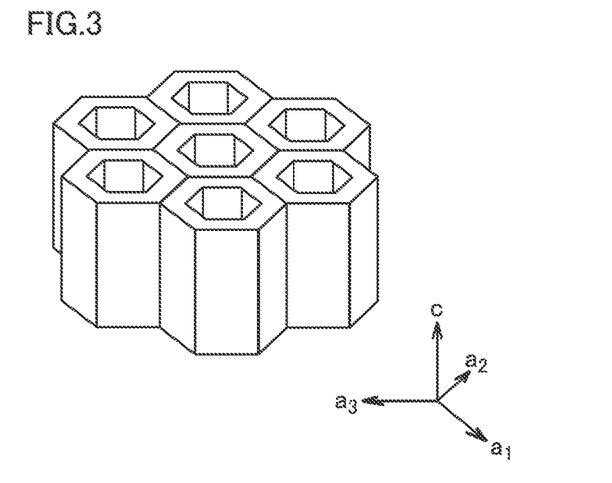
FIG. 3 is a first conceptual diagram illustrating an example of an inorganic oxide particle according to an embodiment of the present disclosure.

FIG. 3 is a first conceptual diagram illustrating an example of an inorganic oxide particle of the present embodiment.

The mesopores in each inorganic oxide particle may extend one-dimensionally or two-dimensionally. In FIG. 3, the mesopores extend in one direction along c axis. The mesopores may be hexagonal, for example, in the cross section orthogonal to the axial direction of the mesopores. In the mesoporous inorganic oxide particles, a large number of hydroxyl groups may exist not only on the outer surface of the particles but also on the inner wall of mesopores.

Figure 4:
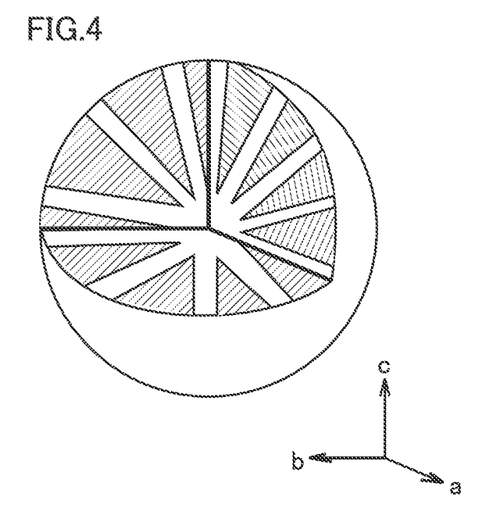
FIG. 4 is a second conceptual diagram illustrating an example of an inorganic oxide particle according to an embodiment of the present disclosure.

FIG. 4 is a second conceptual diagram illustrating an example of an inorganic oxide particle of the present embodiment.

The inorganic oxide particles may be spherical, and the mesopores contained in each inorganic oxide particles may extend radially from the center of each inorganic oxide particle toward the outer surface thereof. In other words, the mesopores may extend three-dimensionally. As a result, it is expected that excellent access is available from the outer surface of each particle to the inside thereof, which thereby improves the ignition retardancy of the electrolyte composition. Such inorganic oxide particles may be formed by, for example, a molecular template method which uses a surfactant as the template.

The term of "spherical" means that in a projected image (for example, an electron microscope image) of a particle on a two-dimensional plane, the ratio of the minimum diameter of the contour line of the particle relative to the maximum diameter of the contour line of the particle is 0.8 or more and 1 or less.

The fact that the mesopores extend radially from the center of the inorganic oxide particles toward the outer surface thereof may be confirmed in the following manner, for example. Specifically, the methanol solution of chloroplatinic acid (for example, 0.02 mol/l) is introduced into the mesopores of the inorganic oxide particles, and an evaporator or the like is used to remove methanol. Then, the inorganic oxide particles are subjected to a reduction treatment at 400° C. for 2 hours in a hydrogen stream. After the reduction treatment, the inorganic oxide particles are observed with a transmission electron microscope (TEM). In the TEM image of the inorganic oxide particles, it is confirmed that the mesopores extend radially from the center of each inorganic oxide particle toward the outer surface thereof.

The inorganic oxide particles may be monodispersed particles. Since the inorganic oxide particles are monodispersed, each of the inorganic oxide particles is expected to exhibit equivalent radical trapping effect, which thereby improves the ignition retardancy of the electrolyte composition. The term of "monodispersed particle" refers to such a particle that has a variation coefficient of the particle size of 0.1 or less. The variation coefficient of the particle size is calculated by dividing the standard deviation of the particle size by the average particle size.

The inorganic oxide particles may be monodispersed, spherical and have mesopores radially extending from the center of each inorganic oxide particle toward the outer surface thereof. In other words, the inorganic oxide particles may be monodispersed mesoporous silica spheres (MMSS). The MMSS may have a BET specific surface area of, for example, 1000 $m^2/g$ or more.

"Other Ingredients"

In addition to the above ingredients, the electrolyte composition may further contain other ingredients. As examples of other ingredients, various functional additives or the like may be given. The ratio of the functional additive to the electrolyte composition may be, for example, 0.1 mass % or more to 10 mass % or less. As examples of the functional additive, a gas generating agent (so-called overcharge additive), a SEI (solid electrolyte interface) film forming agent and the like may be given.

As examples of the gas generating agent, cyclohexylbenzene (CHB), biphenyl (BP) and the like may be given. As examples of the SEI film forming agent, vinylene carbonate (VC), vinylethylene carbonate (VEC), $Li[B(C_2O_4)_2]$ (LiBOB), $LiPO_2F_2$, propane sultone (PS), ethylene sulfite (ES) and the like may be given.

Lithium Ion Secondary Battery

Figure 2:
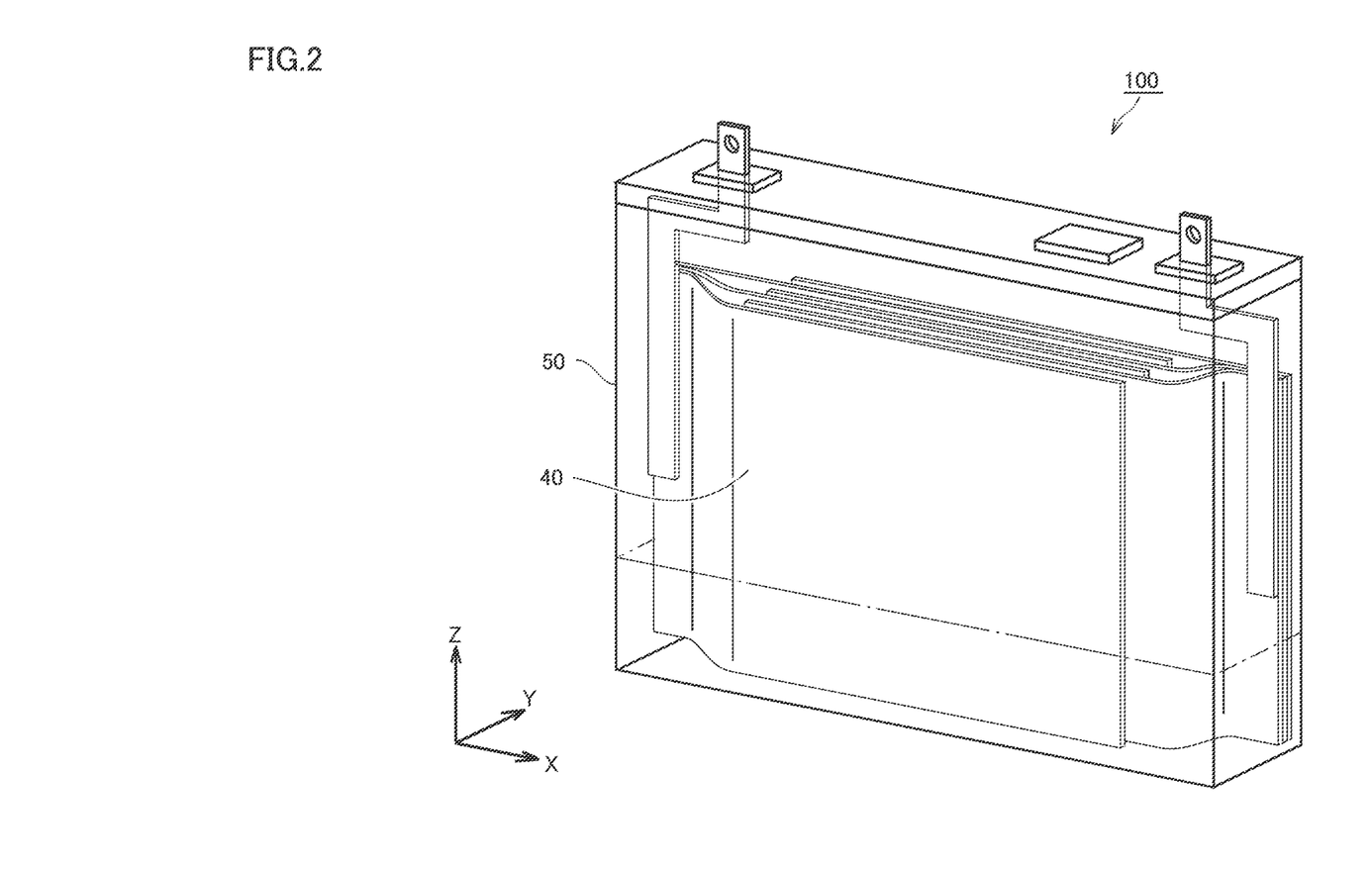
FIG. 2 is a schematic diagram illustrating an example configuration of a lithium ion secondary battery according to an embodiment of the present disclosure.

FIG. 2 is a schematic diagram illustrating an example of the configuration of the lithium ion secondary battery according to the present embodiment.

Hereinafter, the lithium ion secondary battery may be abbreviated as "battery". The battery 100 includes a case 50. The case 50 is hermetically sealed. The case 50 has a prismatic shape (flat rectangular parallelepiped shape). The case 50 may be made of, for example, an aluminum (Al) alloy or the like. It should be noted that the case is not limited to the prismatic shape. The case may be cylindrical. The case may be in the form of a pouch made of, for example, Al laminated film or the like. In other words, the battery may be a laminate-type battery.

The case 50 houses an electrode group 40 and an electrolyte composition. The dot-chain line in FIG. 2 indicates the liquid surface of the electrolyte composition. The electrolyte composition is the electrolyte composition of the present embodiment described above. In other words, the battery 100 includes at least the electrolyte composition of the present embodiment. The details of the electrolyte composition are as described above. Since the electrolyte composition is ignition retardant, the battery 100 is expected to be resistant to abnormal usage involving heating, short circuit, overcharge and the like.

The electrode group 40 is electrically connected to an external terminal. The electrode group 40 includes a positive electrode, a negative electrode, and a separator. The voids in the electrode group 40 are impregnated with the electrolyte composition. The electrode group 40 is of a stack type. In other words, the electrode group 40 is formed by alternately stacking the positive electrode and the negative electrode with the separator sandwiched between the positive electrode and the negative electrode. It should be noted that the electrode group may be of a winding type. The winding type electrode group may be formed, for example, by laminating a positive electrode, a separator and a negative electrode in order and winding the same spirally.

"Positive Electrode"

The positive electrode may be in the form of a sheet. The positive electrode may include, for example, a positive electrode current collector and a positive electrode composite material layer. The positive electrode current collector may be, for example, an Al foil or the like. The positive electrode composite material layer may be formed on one surface of the positive electrode current collector or may be formed on both the front surface and the back surface of the positive electrode current collector. The positive electrode composite material layer may at least include a positive electrode active material. The positive electrode composite material layer may include, for example, a positive electrode active material at 80 mass % or more to 98 mass % or less, a conductive material at 1 mass % or more to 10 mass % or less, and the remainder of a binder.

The positive electrode active material is not particularly limited. For example, the positive electrode active material may be $LiCoO_2$, $LiNiO_2$, $LiMnO_2$, $LiMn_2O_4$, $Li(N_{1/3}Co_{1/3}Mn_{1/3})O_2$, $LiNi_{0.8}Co_{0.15}Al_{0.05}O_2$, $LiFePO_4$ or the like. The positive electrode active material may be used alone in one kind or in combination of two kinds or more. Further, the conductive material is not particularly limited. For example, the conductive material may be acetylene black (AB) or the like. Furthermore, the binder is not particularly limited. For example, the binder may be polyvinylidene difluoride (PVdF) or the like.

"Negative Electrode"

The negative electrode may be in the form of a sheet. The negative electrode may include, for example, a negative electrode current collector and a negative electrode composite material layer. The negative electrode current collector may be, for example, a copper (Cu) foil or the like. The negative electrode composite material layer may be formed on one surface of the negative electrode current collector or may be formed on both the front surface and the back surface of the negative electrode current collector. The negative electrode composite material layer may at least include a negative electrode active material. The negative electrode composite material layer may include, for example, a negative electrode active material at 80 mass % or more to 99.5 mass % or less and the remainder of a binder.

The negative electrode active material is not particularly limited. For example, the negative electrode active material may be graphite, soft carbon, hard carbon, silicon, silicon oxide, silicon-based alloy, tin, tin oxide, tin-based alloy or the like. The negative electrode active material may be used alone in one kind or may be used in combination of two kinds or more. Further, the binder is not particularly limited. For example, the binder may be carboxymethyl cellulose (CMC) and styrene butadiene rubber (SBR) or the like.

"Separator"

The separator may be a porous film. The separator is electrically insulating. The separator may be made of, for example, polyethylene (PE), polypropylene (PP) or the like. The separator may have a single-layer structure, for example. The separator may be made of, for example, a porous PE film only. The separator may have a multilayer structure, for example. The separator may be formed, for example, by laminating a porous PP film, a porous PE film, and a porous PP film in order.

Examples

Hereinafter, examples of the present disclosure will be described. It should be noted that the following description is not intended to limit the scope of claims.

Preparation of Electrolyte Composition, and Production of Lithium Ion Secondary Battery As described hereinafter, samples No. 1 to 10 and samples No. 11 to 13 were prepared as the electrolyte composition. Samples No. 1 to 6 and 11 to 12 were prepared as examples, and samples No. 7 to 10 and 13 were prepared as comparative examples. Thereafter, a lithium ion secondary battery containing each electrolyte composition was produced.

"Sample No. 1"

The following materials were prepared.

aprotic organic solvent: EC, DMC, EMC lithium salt: $LiPF_6$ fluorinated phosphorus-based acid ester (fluorinated phosphate): TFEPa SEI film forming agent: LiBOB inorganic oxide particles: silica particles ($SiO_2$ which is nonporous and has an average particle size of 7 nm)

The solvent was prepared by mixing EC, DMC and EMC. The mixing ratio is EC/DMC/EMC=30/40/30 in volume ratio. TFEPa was mixed into the solvent. The mixing ratio is solvent/TFEPa=70/30 in volume ratio. $LiPF_6$ was dissolved in the solvent so that the concentration of $LiPF_6$ is 1 mol/l. The silica particles were dispersed in the solvent. From the above, sample No. 1 was prepared as the electrolyte composition. The ratio of the silica particles to the electrolyte composition is 5 mass %.

The positive electrode active material, AB and PVdF were mixed with N-methyl-2-pyrrolidone (NMP) so as to prepare a paste. The paste was applied to the surfaces (the front and back surfaces) of the positive electrode current collector (having a thickness of 12 μm) and dried to form the positive electrode composite material layer. The positive electrode composite material layer has a coating weight of 39.5 mg/cm² on both surfaces. The positive electrode composite material layer includes the positive electrode active material, AB and PVdF. The mixing ratio is positive electrode active material/AB/PVdF=90/8/2 in mass ratio. The positive electrode composite material layer was rolled and after rolling, the positive electrode composite material layer has a density of 2.9 g/cm³.

The negative electrode active material, CMC and SBR were mixed with water so as to prepare a paste. The paste was applied to the surfaces (the front and back surfaces) of the negative electrode current collector (having a thickness of 10 μm) and dried to form a negative electrode composite material layer. The negative electrode composite material layer has a coating weight of 16.9 mg/cm² on both surfaces. The negative electrode composite material layer includes the negative electrode active material, CMC and SBR. The mixing ratio is the negative electrode active material/CM/SBR=99/0.5/0.5 in mass ratio. The negative electrode composite material layer was rolled, and after rolling, the negative electrode composite material layer has a density of 1.4 g/cm³.

A separator (porous film made of polyethylene) was prepared. LiBOB was added to the electrolyte composition, and the addition amount thereof was 0.05 mol/l. Under an argon atmosphere, the separator was impregnated with the electrolyte composition. The positive electrode, the separator and the negative electrode were laminated in such a manner that the positive electrode and the negative electrode were opposed to each other with the separator interposed therebetween. Accordingly, the electrode group was achieved. The case (pouch made of Al laminated film) was prepared. The electrode group was housed in the case, and the case was hermetically sealed. Thus, a duel-electrode electrochemical cell (lithium ion secondary battery) was produced.

"Sample No. 2"

As shown in the following Table 1, except that zirconia particles (ZrO₂ which is nonporous and has average particle size 20 nm) were used instead of silica particles (SiO₂), an electrolyte composition was prepared and a duel-electrode electrochemical cell was produced in the same manner as sample No. 1.

"Sample No. 3"

As shown in the following Table 1, except that TFEPi (fluorinated phosphite) was used as a flame retardant instead of TFEPa (fluorinated phosphate) and the mixing ratio of solvent and flame retardant was changed, an electrolyte composition was prepared and a duel-electrode electrochemical cell was produced in the same manner as sample No. 1.

"Sample No. 4"

As shown in the following Table 1, except that the content of the inorganic oxide particles was changed, an electrolyte composition was prepared and a duel-electrode electrochemical cell was produced in the same manner as sample No. 1.

"Sample No. 5"

As shown in the following Table 1, except that TFEPa and TFEPi were used in combination, an electrolyte composition was prepared and a duel-electrode electrochemical cell was produced in the same manner as sample No. 1.

"Sample No. 6"

As shown in the following Table 1, except that BFEMPo (fluorinated phosphonate) was used as a flame retardant instead of TFEPa (fluorinated phosphate), an electrolyte composition was prepared and a duel-electrode electrochemical cell was produced in the same manner as sample No. 1.

"Sample No. 7"

As shown in the following Table 1, except that the flame retardant was not used, an electrolyte composition was prepared and a duel-electrode electrochemical cell was produced in the same manner as sample No. 1.

"Sample No. 8"

As shown in the following Table 1, except that the inorganic oxide particles were not used, an electrolyte composition was prepared and a duel-electrode electrochemical cell was produced in the same manner as sample No. 1.

"Sample No. 9"

As shown in the following Table 1, except that triethyl phosphate (TEPa) was used as a flame retardant, an electrolyte composition was prepared and a duel-electrode electrochemical cell was produced in the same manner as sample No. 8. TEPa is represented by the following formula (14). TEPa is an unfluorinated phosphate.

(14)

"Sample No. 10"

As shown in the following Table 1, except that 5 mass % of inorganic oxide particles were added, an electrolyte composition was prepared and a duel-electrode electrochemical cell was produced in the same manner as sample No. 9.

"Sample No. 11"

As shown in the following Table 1, except that MMSS was used as the inorganic oxide particles and the content of the inorganic oxide particles was changed, an electrolyte composition was prepared and a duel-electrode electrochemical cell was produced in the same manner as sample No. 1.

"Sample No. 12"

As shown in the following Table 1, except that MMSS was used as the inorganic oxide particles, an electrolyte composition was prepared and a duel-electrode electrochemical cell was produced in the same manner as sample No. 4.

"Sample No. 13"

As shown in the following Table 1, except that MMSS was used as the inorganic oxide particles and the content of the inorganic oxide particles was changed, an electrolyte composition was prepared and a duel-electrode electrochemical cell was produced in the same manner as sample No. 7.

Evaluation

"Ignition Test"

Quartz filter paper was prepared. The outer dimension of the quartz filter paper is 10 mm (width)×50 mm (length)× 0.42 mm (thickness). The quartz filter paper was hung vertically. 100 μl of the electrolyte composition was impregnated from the upper end of the quartz filter paper, and a lighter was ignited and brought close to the lower end of the quartz filter paper. In that state, the ignition of the electrolyte composition was confirmed for 1 second. The confirmation results are listed in the following Table 1. "A","B" and "C" listed in the column of "ignition test" in the following Table 1 indicate the following contents. If the confirmation result is "A", it is considered that the electrolyte composition is ignition retardant.

A: Do not catch fire.
B: Catch fire but the fire quickly vanishes.
C: Catch fire and the fire keeps burning.

"Charging/Discharging Efficiency"

The charging/discharging efficiency of each electrochemical cell was measured. The charging was performed according to the constant current and constant voltage (CCCV) charging method. The current for the constant current charging is 0.3 mA, and the voltage for the constant voltage charging is 4.1 V. The charging was terminated when the constant voltage charging time reached 2 hours. The discharging was performed according to the CCCV charging method. The current for the constant current discharging is 0.3 mA, and the voltage for the constant voltage discharging is 3V. The discharging was terminated when the constant voltage discharging time reached 2 hours.

One round of charging and discharging was denoted as one cycle, and two cycles of charging and discharging were carried out. The charging/discharging efficiency of the second cycle was calculated by dividing the discharged capacity of the second cycle by the charged capacity of the second cycle. The results are shown in the following Table 1. The higher the charging/discharging efficiency is, the better the battery will be.

"Electrical Conductivity"

The electrical conductivity of each electrolyte composition was measured by using an electrical conductivity meter. The results are shown in the following Table 1. The higher the electrical conductivity is, the better the battery will be.

In addition, the charging/discharging efficiency and the electrical conductivity were not measured for sample No. 13.

TABLE 1

Sample List and Results

| | Electrolyte composition | | | | | | Evaluation | | |
|---|---|---|---|---|---|---|---|---|---|
| | Aprotic organic solvent | Li salts | | Flame retardants | mixing ratio of aprotic | Inorganic oxide particles | | | charging/ discharging efficiency of 2nd |
| No. | mixing ratio of type EC/DMC/EMC | type | concentration [mol/l] | type | organic solvent/ flame retardant | type | content [mass %] | ignition test | cycle [%] | conductivity [mS/cm] |
| 1 | =30/40/30 (volume ratio) | LiPF$_6$ | 1 | TFEPa | =70/30 (volume ratio) | SiO$_2$ | 5 | A | 95.3 | 5.2 |
| 2 | =30/40/30 (volume ratio) | LiPF$_6$ | 1 | TFEPa | =70/30 (volume ratio) | ZrO$_2$ | 5 | A | 95.1 | 5.2 |
| 3 | =30/40/30 (volume ratio) | LiPF$_6$ | 1 | TFEPi | =80/20 (volume ratio) | SiO$_2$ | 5 | A | 96.5 | 7.4 |
| 4 | =30/40/30 (volume ratio) | LiPF$_6$ | 1 | TFEPa | =70/30 (volume ratio) | SiO$_2$ | 10 | A | 89.5 | 4.2 |
| 5 | =30/40/30 (volume ratio) | LiPF$_6$ | 1 | TFEPa TFEPi | =70/30 (volume ratio) [TFEPa/TFEPi = 50/50 (volume ratio)] | SiO$_2$ | 5 | A | 93.7 | 6.8 |
| 6 | =30/40/30 (volume ratio) | LiPF$_6$ | 1 | BFEMPo | =70/30 (volume ratio) | SiO$_2$ | 5 | A | 91.1 | 6.1 |
| 7 | =30/40/30 (volume ratio) | LiPF$_6$ | 1 | None | =100/0 (volume ratio) | SiO$_2$ | 5 | C | 98.3 | 10.1 |
| 8 | =30/40/30 (volume ratio) | LiPF$_6$ | 1 | TFEPa | =70/30 (volume ratio) | None | 0 | B | 98.8 | 5.2 |
| 9 | =30/40/30 (volume ratio) | LiPF$_6$ | 1 | TEPa | =70/30 (volume ratio) | None | 0 | C | 72.9 | 9.9 |
| 10 | =30/40/30 (volume ratio) | LiPF$_6$ | 1 | TEPa | =70/30 (volume ratio) | SiO$_2$ | 5 | C | 68.5 | 9.3 |
| 11 | =30/40/30 (volume ratio) | LiPF$_6$ | 1 | TFEPa | =70/30 (volume ratio) | MMSS | 3 | A | 87.3 | 4.9 |
| 12 | =30/40/30 (volume ratio) | LiPF$_6$ | 1 | TFEPa | =70/30 (volume ratio) | MMSS | 10 | A | 95.3 | 4.0 |
| 13 | =30/40/30 (volume ratio) | LiPF$_6$ | 1 | None | =100/0 (volume ratio) | MMSS | 10 | C | — | — |

Results

As shown in Table 1 above, samples of No. 1 to 6 and samples of No. 11 and 12, each of which is an electrolyte composition which contains both the flame retardant and the inorganic oxide particles, and the flame retardant is at least one selected from a group consisting of fluorinated phosphorus-based acid ester and fluorinated phosphate amide, have ignition retardancy.

When inorganic oxide particles were used alone, no ignition retardancy was observed (samples No. 7 and 13).

When the fluorinated phosphorus-based acid ester was used alone, no ignition retardancy was observed (sample No. 8). Therefore, it is considered that samples No. 1 and 6 and No. 11 to 12 develop ignition retardancy due to the synergistic action of fluorinated phosphorus-based acid ester or the like and the inorganic oxide particles.

When the phosphate is not fluorinated, even if inorganic oxide particles were used in combination, no ignition retardancy was observed (sample No. 10). The reason may be that a non-fluorinated phosphate is unable to trap hydrogen radicals or the like efficiently due to the lack of an electron withdrawing effect associated with fluorine.

Although the content of inorganic oxide particles in sample No. 11 is smaller than that in sample No. 1, they exhibit the equal ignition retardancy. The reason may be that MMSS has a greater specific surface area and provides excellent access to the inside of the particle from the outside thereof, which makes it possible to develop ignition retardancy even at a smaller amount. According to a comparison performed separately between nonporous silica particles and MMSS, it was confirmed that MMSS had a larger effect.

The embodiment and Examples disclosed herein are illustrative and non-restrictive in every respect. The technical scope defined by the terms of the claims includes any modifications within the scope and meaning equivalent to the terms of the claims.

What is claimed is:

1. An electrolyte composition for a lithium ion secondary battery, at least comprising:
    an aprotic organic solvent;
    a lithium salt;
    a flame retardant; and
    inorganic oxide particles,
    the flame retardant being at least one selected from a group consisting of a phosphorus-based acid ester having a fluorinated alkyl group and a phosphate amide having a fluorinated alkyl group.

2. The electrolyte composition according to claim 1, wherein
    the flame retardant is at least one selected from a group consisting of tris(2, 2, 2-trifluoroethyl) phosphate, tris(2, 2, 2-trifluoroethyl) phosphite and bis(2, 2, 2-trifluoroethyl) methylphosphonate.

3. The electrolyte composition according to claim 1, wherein
    the aprotic organic solvent and the flame retardant satisfy a relationship of aprotic organic solvent/flame retardant=70/30 to 80/20 in volume ratio.

4. The electrolyte composition according to claim 1, wherein
    the inorganic oxide particles are at least one selected from a group consisting of silica particles and zirconia particles.

5. The electrolyte composition according to claim 1, wherein
    the ratio of the inorganic oxide particles to the electrolyte composition is 5 mass % or more to 10 mass % or less.

6. The electrolyte composition according to claim 1, wherein
    the inorganic oxide particles are mesoporous.

7. The electrolyte composition according to claim 6, wherein
    the inorganic oxide particles are spherical, and
    the mesopores contained in each inorganic oxide particle extend radially from the center of each inorganic oxide particle toward the outer surface thereof.

8. The electrolyte composition according to claim 1, wherein
    the inorganic oxide particles are nanoparticles.

9. The electrolyte composition according to claim 1, wherein
    the inorganic oxide particles have an average particle size of 1 nm or more and 100 nm or less.

10. The electrolyte composition according to claim 1, wherein
    the inorganic oxide particles have an average particle size of 7 nm or more and 20 nm or less.

11. The electrolyte composition according to claim 1, wherein
    the inorganic oxide particles have a BET specific surface area of 50 $m^2/g$ or more and 380 $m^2/g$ or less.

12. The electrolyte composition according to claim 1, wherein
    in the inorganic oxide particles, a number density of hydroxyl groups is 3 per $nm^2$ or more and 5 per $nm^2$ or less.

13. A lithium ion secondary battery comprising at least the electrolyte composition according to claim 1.

* * * * *